United States Patent [19]

Bouchal

[11] Patent Number: 5,261,528
[45] Date of Patent: Nov. 16, 1993

[54] ROLLER FOR BELT CONVEYOR

[76] Inventor: Milan Bouchal, 11328-10 Ave., Edmonton, Alberta T6J 6S9, Canada

[21] Appl. No.: 38,295

[22] Filed: Mar. 29, 1993

[30] Foreign Application Priority Data

Apr. 1, 1992 [CS] Czechoslovakia .............. PV 962-92

[51] Int. Cl.⁵ ............................................. B65G 39/10
[52] U.S. Cl. ............................... 198/842; 193/37; 384/480
[58] Field of Search ............ 198/835, 842; 193/37; 384/144, 147, 148, 480, 484, 485, 489

[56] References Cited

U.S. PATENT DOCUMENTS

| 3,313,168 | 4/1967 | Matthews | 198/842 X |
| 4,139,203 | 2/1979 | Garrison | 384/480 X |
| 4,379,600 | 4/1983 | Müller | 384/480 |
| 4,972,939 | 11/1990 | Uttke et al. | 198/842 X |
| 5,028,054 | 7/1991 | Peach | 384/480 X |

FOREIGN PATENT DOCUMENTS 1187030 5/1985 Canada .
248200 11/1987 Czechoslovakia .
249678 10/1988 Czechoslovakia .
2738449 3/1979 Fed. Rep. of Germany ...... 198/842
543584 3/1977 U.S.S.R. .......................... 198/842

*Primary Examiner*—D. Glenn Dayoan
*Attorney, Agent, or Firm*—Stevens, Davis, Miller & Mosher

[57] ABSTRACT

The head (11) (40) of a belt conveyor roller is press-fit into a cylindric shell (10) of the roller. The head (11) (40) defines a bearing chamber (12) for a frictionless bearing (14-15; 42) which is closed by a ring assembly (21, 29) welded to the head and provided, in the embodiment disclosed, with a stainless steel lamella (33, 59) the opening (60) of which bites into the resilient outer cylindric surface (61) of a hub section (28, 53), to provide a virtually hermetical enclosure of the bearing chamber (12, 41) thus increasing the safety of the operation by isolating the possible point of ignition or explosion on seizure of the bearing (14-15; 41) of the roller. The roller equipped with the assembly of the present invention thus presents a further improvement in the art of belt conveyors for use in hazardous environments.

11 Claims, 2 Drawing Sheets

ROLLER FOR BELT CONVEYOR

FIELD OF THE INVENTION

The invention relates to a roller for use in belt conveyors, particularly belt conveyors for handling fine ashes with hot water, or exposed to the effects of low pressure steam and various chemical corrosive substances. The invention is also related to conveyors operating in a potentially explosive atmosphere, e.g. in deep mines.

BACKGROUND OF THE INVENTION

It is known to provide various designs of the end caps and bearing assemblies directed to improve safety of operation of belt conveyors in hazardous environment.

According to Czechoslovak Author's Certificate 248,200, each end of the axle of a conveyor roller has an axle section which supports an antifriction bearing provided with knurling. Located exteriorly of the bearing is a rubber seal with sealing lips and with protective stamped metal sheet members. While providing relatively good sealing effects against penetration of dust and other impurities into the bearing mount assembly, the arrangement does not prevent the contact of red-hot parts of a seized bearing with the ambient atmosphere, which increases the fire or explosion hazard.

In the arrangement according to Czechoslovak Author's Certificate 249,678, bearings are located in inner openings of profiled end members. The end members are firmly connected to each other by a connecting spacer tube. Each bearing is provided, at the outwardly directed side, with a two-part sealing labyrinth the position of which on the axle is limited by a snap ring. The labyrinth seal is separated from the surroundings by means of a corrugated lid or a dust cap. The position of the dust cap is fixed by an inserted expansion ring. The end cap is provided with a profiled shield or cover to prevent damage to the seal assembly of the bearing. A similar principle is utilized in Canadian Patent 1,187,030, where the corrugated lid is replaced with a removable sealing cover. The disadvantage of these structures is in that they do not entirely secure the operation of the sealing assembly in extreme operation conditions, which increases the need of checks and limits their applicability, e.g. in mines or other potentially explosive environments where, in case of the seizing of the bearings, it is necessary to stop the belt conveyor which gives rise to substantial operation losses.

OBJECT OF THE INVENTION

It is an object of the present invention to further reduce or obviate drawbacks mentioned above and in particular to improve the isolation of the bearing assembly from the surrounding atmosphere.

SUMMARY OF THE INVENTION

In general terms, the present invention provides in a fully assembled state a roller for use in belt conveyor including a hollow cylindric shell and two end assemblies, one at each end of the shell, the assemblies being generally a mirror image of each other, each end assembly comprising, in combination:

(a) a generally cylindric head coaxial with said shell and fixedly and hermetically secured to same;

(b) said head defining a bearing chamber; an antifriction bearing mounted in the bearing chamber for rotatably supporting the roller on an axle, said head further defining a generally cylindric seal chamber disposed axially outwardly of and coaxial with said bearing chamber;

(c) a seal assembly disposed in said seal chamber and comprising:

(1) a bush portion with a radially inwardly directed flange, said bush portion being made of a thermoplastic material and having an axially inner face abutting against an outer ring of said antifriction bearing, the other, axially outer face of the bush portion being hermetically secured to an outer face portion of said head;

(2) a hub portion with a radially outwardly directed flange, an inner axial face of said hub portion abutting against an inner ring of said antifriction bearing, said hub portion including a generally cylindric sleeve section, a part of said sleeve section projecting axially out of the head, said sleeve section being press fit mounted on the respective axle and including a lamella engaging surface part which has a first predetermined resiliency; and (3) seal means disposed between said flanges, said bush portion and said sleeve section;

(d) an annular front cover lamella made of a material having a second predetermined resiliency which is substantially different from the first predetermined resiliency, to allow an overlapping but mutually rotational engagement between the lamella and said lamella engaging surface part of the hub section;

(e) an annular securement member placed over an outer face of said lamella and holding same in axial engagement with the axially outer face of the bush portion; and (f) locking means for interlocking said lamella and the head for a synchronous rotation.

In a non-assembled state, and still defined in general terms the invention provides: an end assembly for use in a belt conveyor roller, which roller includes a hollow cylindric shell and two end assemblies, one at each end of the shell, the assemblies being generally a mirror image of each other, each end assembly comprising, in combination:

(a) a generally cylindric head compatible with said shell for becoming fixedly, coaxially and hermetically secured to same;

(b) said head defining a bearing chamber adapted to receive an antifriction bearing for rotatably supporting a respective roller on an axle, said head further defining a generally cylindric seal chamber adapted to be disposed, upon assembly, axially outwardly of and coaxial with said bearing chamber;

(c) a seal assembly adapted to become disposed in said seal chamber and comprising:

(1) a bush portion with a radially inwardly directed flange, said bush portion being made of a thermoplastic material and having an axially inner face adapted to abut against an outer ring of a respective antifriction bearing, the other, axially outer face of the bush portion being adapted to become hermetically secured to an outer face portion of said head;

(2) a hub portion with a radially outwardly directed flange, an inner axial face of said hub portion being adapted to abut, upon assembly, against an inner ring of said respective antifriction bearing, said hub portion including a generally cylindric sleeve section, a part of said sleeve section beind adapted to project, upon assembly, axially out of the head, said sleeve section being dimensioned for a press fit on a respective axle and including a lamella engaging surface part which has a first predetermined resiliency; and (3) seal means adapted to become disposed between said flanges, said bush portion and said sleeve section;

(d) an annular front cover lamella made of a material having a second predetermined resiliency which is substantially different from the first predetermined resiliency, and having an opening; the difference between the predetermined resiliencies and the size of said opening of the lamella being suitable to allow an overlapping but mutually rotational engagement between the lamella and said lamella engaging surface part of the hub section;

(e) an annular securement member adapted to be placed over an outer face of said lamella to holding same in axial engagement with the axially outer face of the respective bush portion; and (f) locking means for interlocking said lamella and the head for a synchronous rotation.

Preferably, the locking means is a plurality of axial passages in said lamella and a plurality of compatible locking pins or stems projecting inwardly from said securement member through said passages into correspondingly shaped recesses in the casing.

In accordance with another feature of the invention, the seal means is a soft seal ring, preferably a felt seal which may be maintained in a firm connection with one of the flanges by projections in the flange penetrating one face of the soft seal.

The structural arrangement according to the invention provides a virtually hermetical sealing of the bearing chamber and of the seal assembly and thus their separation from the ambient atmosphere which, in the case of seizure of a bearing, prevents contact of the sparking or red hot parts of the bearing with the surrounding atmosphere. Thus, it is not necessary to immediately stop the belt conveyor upon seizure of the bearing of just one roller. The replacement of the rollers can be made during scheduled shutdowns or revisions of the device. The arrangement of the parts of the assembly eliminates axial displacement of sealing parts during the movement of the axle in the bearing and thus in effect eliminates a change of the position of the roller relative to the axle. However, even in the case of such axial displacement, no change occurs in the relative position of the sealing labyrinths or safety seal and the bush of the labyrinth seal. Furthermore, the components of the entire assembly can be made from electro-conductive plastic materials can be used if it is important to reduce or eliminate the accumulation of electro-static charge on the jacket to reduce or eliminate another potential source of an explosion.

BRIEF DESCRIPTION OF THE DRAWINGS

The invention will now be described by way of two exemplary embodiments, both showing the assembled state, with reference to the accompanying simplified, diagrammatic, out of scale drawings. In the drawings.

DESCRIPTION OF THE PREFERRED EMBODIMENTS

Figure 1:
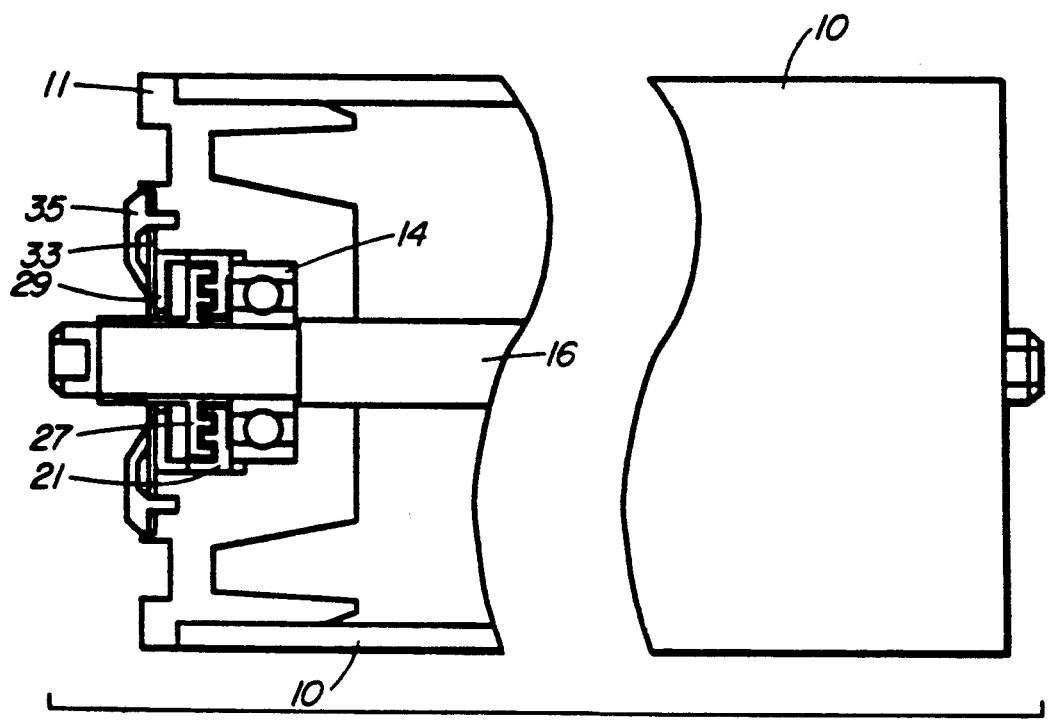
FIG. 1 is a diagrammatic longitudinal section of a conveyor roller according to the invention.

The roller according to FIG. 1 is comprised of a hollow steel cylindric shell 10. At each end a head 11 is pressed in the shell 10. The head 11 is made from a high-strength, fire resistant plastic material. Such material is commercially available, as an example, under the trade name ABS TM. A cylindric bearing chamber 12 is formed inside the head 11. It defines an inner shoulder 13. The chamber 12 is compatible with an antifriction bearing. In the embodiment shown, the bearing is a ball bearing comprised of an outer ring 14, an inner ring 15 and a plurality of spheres running in races of the rings 14, 15, as is well known in the art.

The inner ring 15 is press mounted on an axle 16 near the respective free end portion 17 thereof. A cutout 18 in the face of the free end portion 17 is engaged by a support 19 holding the axle 16 and thus the entire roller in place on conveyor frame (not shown).

FIG. 1 shows that the inner axial face of the outer ring 14 of the bearing engages the shoulder 13, while the opposed, outer face of the outer ring 14 abuts against an inner face 20 of a bush portion 21 of a seal assembly, in the embodiment of FIG. 1, a labyrinth seal assembly. The bush portion 21 has a cylindric sleeve section 22 press fit in a seal chamber 23 disposed outwardly of and coaxial with the bearing chamber 12. The bush portion 21 further includes an inwardly directed flange 24 (also referred to as "a first flange portion") which is provided with a pair of concentric annular ribs 25 projecting axially outwardly from the face of the flange 24.

The ribs 25 are compatible with a pair of axially inwardly directed ribs 26 of a second flange portion 27 which is an integral part of a cylindric hub portion 28. The cylindric hub portion 28 projects axially outwardly of the head 11. The two flange portions 24, 27 thus combine to provide the labyrinth seal assembly, as is well known in the art.

Both the bush portion 21 and the hub section are molded from the ABS TM thermoplastic material referred to above. It is important that the material of the hub section have a predetermined resiliency. In the embodiment shown, the resiliency generally corresponds to the hardness of about 115 R scale.

As mentioned, the inner face 20 of the bush 21 abuts against the outer ring 14 of the ball bearing. The opposite end of the sleeve section 22 of the bush 21 is welded, by friction or ultrasound welding, to a cylindric, axially outer section 29 which is likewise made from the ABS TM plastic material and is hermetically welded, at a weld 30, to the outer face of the casing 11. The outwardly turned face of the outer section 29 defines an inwardly directed third flange 31 which combines with the second flange 27 and the inner surface of the outer section 29, to provide a second seal chamber in which is disposed a felt seal ring 32.

The axially outer face of the outer section 29 abuts against an annular, metallic front cover lamella 33. In the embodiments shown, which is preferred, the lamella 33 is made from stainless steel. Its thickness is about 0.35 mm and its inner diameter is about 30.60 mm, the outer diameter of the embodiment shown being about 68.0 mm. Near its periphery, four equidistantly spaced locking passages 34 are provided. In accordance with a preferred embodiment of the present invention, the lamella is made of stainless steel and its inner diameter is in a biting engagement with the outer cylindric surface of the hub section 28. The hub section 28 or at least its outer cylindric surface must possess a predetermined resiliency which would allow expansion of the hub section 28 upon press mounting same on the shaft, to provide the "biting" engagement without causing the lamella 33 to cut into the surface of the cylindric surface. The production tolerances must also provide the desired "biting" effect. As an example, in the embodiment shown, the outer cylindric section has the resiliency which corresponds to the hardness of about 115 R scale. The diameter of the outer cylindric section is 30.60 mm with tolerances of +0.00; −0.05 mm. With the hub section 28 press fit on the axle 16, the inner diameter "bites" but does not cut into the plastic material of the hub section 28, while allowing relative rotation between the hub 28 and the lamella 33. This secures a virtually hermetic seal at the axle 16 as well.

The lamella 33 is held in place by an annular securement member or holding ring 35 placed over an outer face of the lamella 33. In the embodiment shown, the ring 35 is made, from the same ABS ™ plastic as the remaining parts of the arrangement. The holding ring 35 has four integral, equidistantly spaced apart, axially oriented locking pins or stems 36. As shown, they pass through the locking passages 34 and engage, at a press fit, corresponding openings 37 in the casing 11 to hold the lamella 33 firmly in place and prevent it from rotating relative to the head 11.

Figure 2:
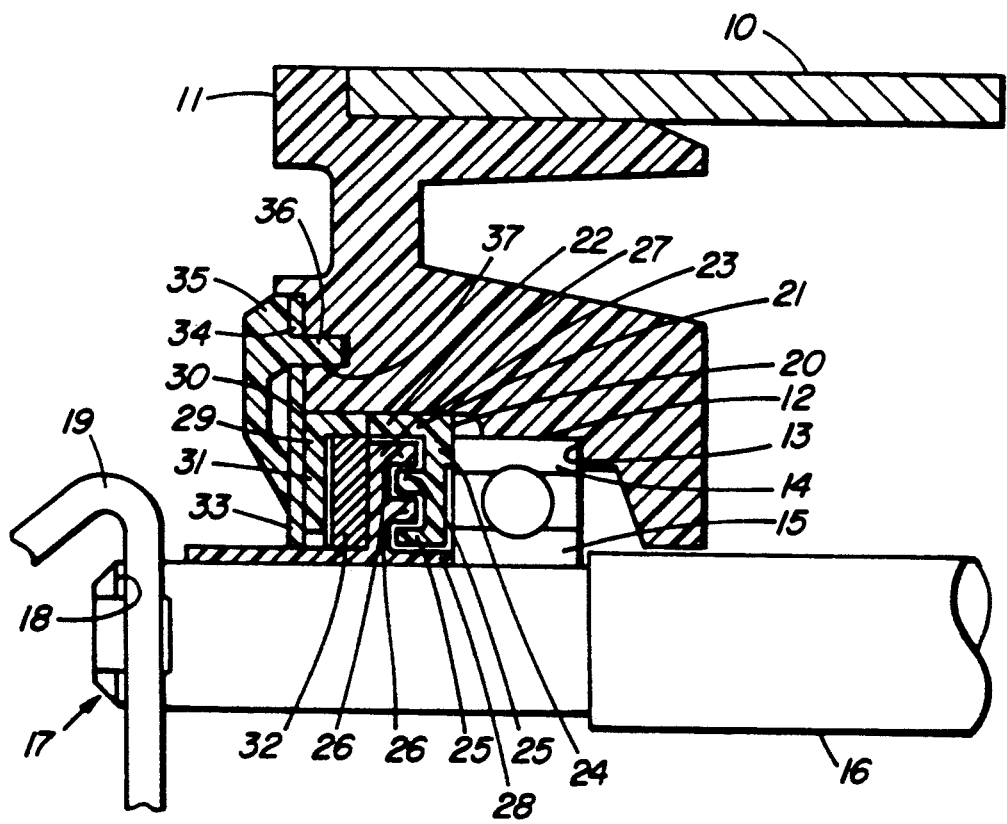
FIG. 2 is an enlarged partial longitudinal section of FIG. 1.
Figure 3:
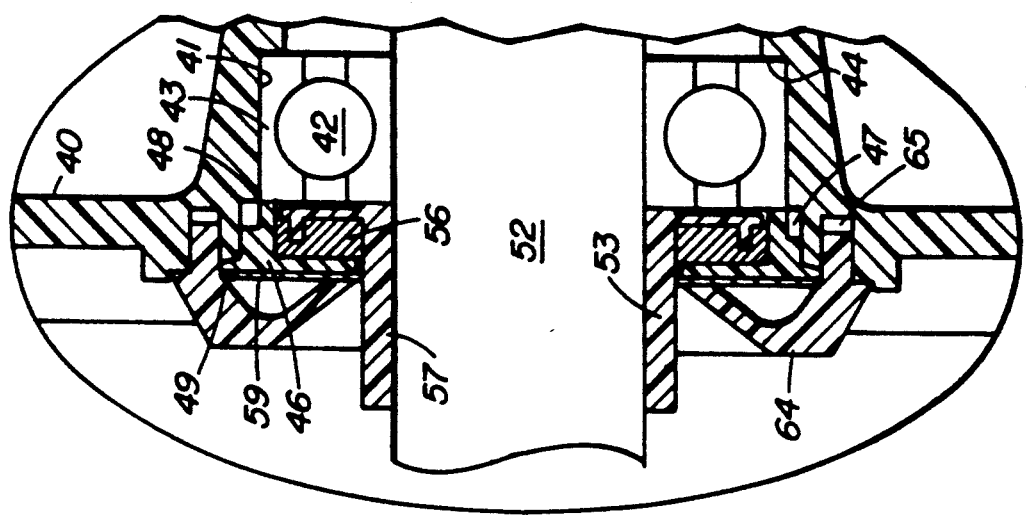
FIG. 3 is a section similar to that of FIG. 2 but showing main components of a second embodiment of the present invention.
Figure 4:
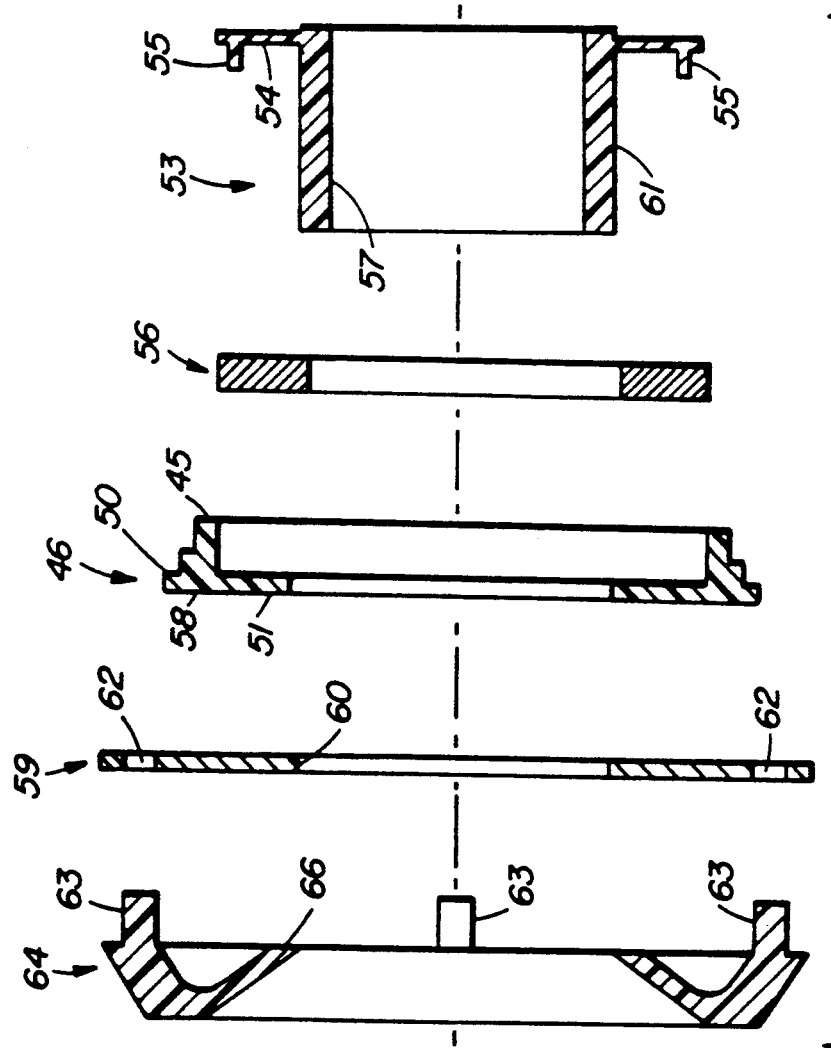
FIG. 4 is a simplified exploded view showing certain elements of FIG. 3, some of the elements being shown out of scale for clarity.

Turning now to the embodiments shown in FIGS. 3 and 4, it should be firstly noted that all components shown in the drawing are produced from the same material as in FIGS. 1 and 2. That is to say, the head or casing 40 is made of the same ABS ™, as are the components to be described hereafter.

As in the first embodiment, there is a cylindric bearing chamber 41 provided inside the head 40. The chamber receives an anti-friction bearing 42 whose outer ring 43 abuts against a shoulder 44 of the cylindric chamber 41. The outer face of the ring 43 is an abutment against and ultrasonically welded to an inner face 45 (FIG. 4) of a bush portion or ring 46 made from the same type of plastic material and press fit in a seal chamber 47 of the head 40. The ring 46 is ultrasonically welded to the head 40 at two points. At the rear, at point 48 and, at the front, at point 49. It can be observed on comparison of FIGS. 3 and 4 that the point 49 presents a bevelled shape of an edge 50 of the ring 46. The ring 46 presents an inwardly directed flange portion 51.

Press-fit mounted on the roller axle 52 is a hub portion 53 which defines an inwardly directed second flange 54 integral with a number of axially outwardly directed pins 55. As shown in FIG. 3, the pins 55 penetrate the inner axial face of a felt seal ring 56 to maintain the ring 56 fixed relative to the hub section 53 and thus rotatable relative to the ring 46. The hub portion 53 has a cylindric portion 57 which projects outwardly from the head 40, as in the first described embodiment. The outwardly directed face 58 of the ring 46 is overlapped by a thin lamella 59 which is shown in greater detail and in exaggerated thickness in FIG. 4. As in the first embodiment, the lamella defines an inner opening 60 having a diameter machined to provide a biting engagement described above in connection with the first embodiment with the outer cylindric surface 61 of the cylindric portion 57 of the hub 53. Exemplarily diameters of the two portions 60, 61 are given in the preceding embodiment.

In the embodiment shown, the lamella 59 also defines a total of four passages 62 which are compatible with four stems 63 of a holding ring 64. The stems 63 are dimensioned to press-fit in four locking bores 64 provided in the head 40. They may also be ultrasonically welded to the bores 64 to further strengthen the hold of the lamella 59 in place. The main central opening 66 of the locking ring 64 is dimensioned to allow free rotatable movement relative to the outer cylindric surface 61 of the hub 53.

In operation, the head 40 which is press-fit in one end of a shell (the shell not shown in FIGS. 3 or 4), rotates relative to the axle 52 due to the bearing 42, in common, with the ring 46, lamella 59 and the locking ring 64. The hub portion 53, on the other hand is common to the axle 52, together with the felt ring 56 which is held in place by the pins 55.

It can be observed from the above that the arrangement of the lamella 59 in the biting engagement with the cylindric surface 61, combined with the welds 49 and 48 isolate the bearing chamber 41 and thus the bearing from the exterior of the roller in a practically hermetic fashion. The second embodiment thus presents the same advantages as the first embodiment and at the same time substantially simplifies the area of the seals where the labyrinth seal assembly is no longer required.

Those skilled in the art will readily appreciate that many modifications can be effected to the arrangement of the present invention without departing from the scope of the present invention.

I therefore wish to protect by letters patent which may issue on this application all such embodiments as fairly fall within the scope of my contribution to the art.

I claim:

1. A roller for use in belt conveyor including a hollow cylindric shell and two end assemblies, one at each end of the shell, the assemblies being generally a mirror image of each other, each end assembly comprising, in combination:
   (a) a generally cylindric head coaxial with said shell and fixedly and hermetically secured to same;
   (b) said head defining a bearing chamber; an antifriction bearing mounted in the bearing chamber for rotatably supporting the roller on an axle, said head further defining a generally cylindric seal chamber disposed axially outwardly of and coaxial with said bearing chamber;
   (c) a seal assembly disposed in said seal chamber and comprising:
     (1) a bush portion with a radially inwardly directed flange, said bush portion being made of a thermoplastic material and having an axially inner face abutting against an outer ring of said antifriction bearing, the other, axially outer face of the bush portion being hermetically secured to an outer face portion of said head;
     (2) a hub portion with a radially outwardly directed flange, an inner axial face of said hub portion abutting against an inner ring of said antifriction bearing, said hub portion including a generally cylindric sleeve section, a part of said sleeve section projecting axially out of the head, said sleeve section being press fit mounted on the respective axle and including a lamella engaging surface part which has a first predetermined resiliency; and (3) seal means disposed between said flanges, said bush portion and said sleeve section;

(d) an annular front cover lamella made of a material having a second predetermined resiliency which is substantially different from the first predetermined resiliency, and having an opening; the difference between the predetermined resiliencies and the size of said opening of the lamella being suitable to allow an overlapping but mutually rotational engagement between the lamella and said lamella engaging surface part of the hub section;

(e) an annular securement member placed over an outer face of said lamella and holding same in axial engagement with the axially outer face of the bush portion; and (f) locking means for interlocking said lamella and the head for a synchronous rotation.

2. A roller as claimed in claim 1, wherein said locking means is a plurality of axial passages in said lamella and a plurality of compatible locking stems projecting inwardly from said securement member through said passages into correspondingly shaped recesses in the head, whereby both the lamella and the securement member are locked for said synchronous rotation.

3. A roller as claimed in claim 1, wherein the seal means is a soft annular seal.

4. A roller as claimed in claim 3, wherein the soft annular seal is a felt seal.

5. A roller as claimed in one of claims 3, wherein one of said flanges is provided with locking projections penetrating an adjacent face of said seal.

6. A roller as claimed in one of claims 3, wherein said outwardly directed flange is provided with locking projections adapted to penetrate an adjacent face of said seal for securement of a synchronous rotation of the seal with the second flange portion.

7. A roller as claimed in claim 1, wherein said inwardly directed flange and said outwardly directed flange are provided with complementary axial projections defining a labyrinth seal therebetween.

8. A roller as claimed in claim 7, wherein said bush portion is comprised of an axially inner subsection abutting against said outer ring of the bearing, and an axially outer subsection fixedly secured to the casing and to the axially inner subsection, said axially outer subsection including an axially outward, second radially inwardly directed end wall flush with said lamella and defining, with the outwardly directed second flange portion, a second seal chamber housing a soft seal ring, whereby the seal assembly comprises a labyrinth seal and a soft annular seal, the two seals being disposed one to each axial side of said outwardly directed flange.

9. A roller as claimed in claim 8, wherein the hermetic securement of said bush portion to the casing is made by welding said axially outer section to the casing.

10. A roller as claimed in claim 1, wherein the hermetic securement of said bush portion to the casing is made by welding the thermoplastic material of the bush portion to the head.

11. An end assembly for use in a belt conveyor roller, which roller includes a hollow cylindric shell and two end assemblies, one at each end of the shell, the assemblies being generally a mirror image of each other, each end assembly comprising, in combination:

(a) a generally cylindric head compatible with said shell for becoming fixedly, coaxially and hermetically secured to same;

(b) said head defining a bearing chamber adapted to receive an antifriction bearing for rotatably supporting a respective roller on an axle, said head further defining a generally cylindric seal chamber adapted to be disposed, upon assembly, axially outwardly of and coaxial with said bearing chamber;

(c) a seal assembly adapted to become disposed in said seal chamber and comprising:

(1) a bush portion with a radially inwardly directed flange, said bush portion being made of a thermoplastic material and having an axially inner face adapted to abut against an outer ring of a respective antifriction bearing, the other, axially outer face of the bush portion being adapted to become hermetically secured to an outer face portion of said head;

(2) a hub portion with a radially outwardly directed flange, an inner axial face of said hub portion being adapted to abut, upon assembly, against an inner ring of said respective antifriction bearing, said hub portion including a generally cylindric sleeve section, a part of said sleeve section beind adapted to project, upon assembly, axially out of the head, said sleeve section being dimensioned for a press fit on a respective axle and including a lamella engaging surface part which has a first predetermined resiliency; and (3) seal means adapted to become disposed between said flanges, said bush portion and said sleeve section;

(d) an annular front cover lamella made of a material having a second predetermined resiliency which is substantially different from the first predetermined resiliency, and having an opening; the difference between the predetermined resiliencies and the size of said opening of the lamella being suitable to allow an overlapping but mutually rotational engagement between the lamella and said lamella engaging surface part of the hub section;

(e) an annular securement member adapted to be placed over an outer face of said lamella to holding same in axial engagement with the axially outer face of the respective bush portion; and (f) locking means for interlocking said lamella and the head for a synchronous rotation.

* * * * *